United States Patent [19]

Frye

[11] 4,003,538

[45] Jan. 18, 1977

[54] ARTICLE HOLDING DEVICE

[76] Inventor: Bruce J. Frye, 13601 69th Ave. N., R.R. No. 2, Osseo, Minn. 55369

[22] Filed: Sept. 2, 1975

[21] Appl. No.: 609,499

[52] U.S. Cl. .......................... 248/467; 24/73 VA; 24/265 H; 24/DIG. 11; 248/205 A; 428/99; 428/100; 428/213; 428/215; 428/336; 428/337; 428/339; 428/343; 428/354; 428/483

[51] Int. Cl.$^2$ .................... A44B 21/00; C09J 7/02; B32B 27/08; B32B 27/30

[58] Field of Search ............. 428/40, 99, 100, 354, 428/343, 213, 483, 215, 336, 337, 339; 150/278, 289; 427/207; 248/467, 205 A; 24/DIG. 11, 265 H, 73 VA

[56] References Cited

UNITED STATES PATENTS

| | | | |
|---|---|---|---|
| 2,889,038 | 6/1959 | Kalleberg | 428/354 X |
| 3,098,272 | 7/1963 | Frye | 24/DIG. 11 X |
| 3,173,826 | 3/1965 | Campbell et al. | 428/40 X |
| 3,241,795 | 3/1966 | Frye | 248/467 X |
| 3,350,045 | 10/1967 | Mayers | 248/467 X |
| 3,425,889 | 2/1969 | Willits | 248/223 X |
| 3,856,249 | 12/1974 | Frye | 248/205 A |
| 3,885,768 | 5/1975 | Frye | 248/467 |
| 3,919,443 | 11/1975 | Porter | 428/99 X |

*Primary Examiner*—Harris A. Pitlick
*Attorney, Agent, or Firm*—Leo Gregory

[57] ABSTRACT

An article holding device consisting of a layered structure having a resilient core layer of relatively substantial thickness deformable under pressure for complete contact with a supporting surface, a holding member carried by said core layer, a thin non-stretchable layer at each side of said core layer rendering said core layer relatively inflexible, one of said thin layers having an outer adhesive surface whereby the load carried by said device is spread throughout the full extent thereof and said device is adapted to have its several layers separable removable for removal of the device from a supporting surface without marring or damaging such surface.

7 Claims, 6 Drawing Figures

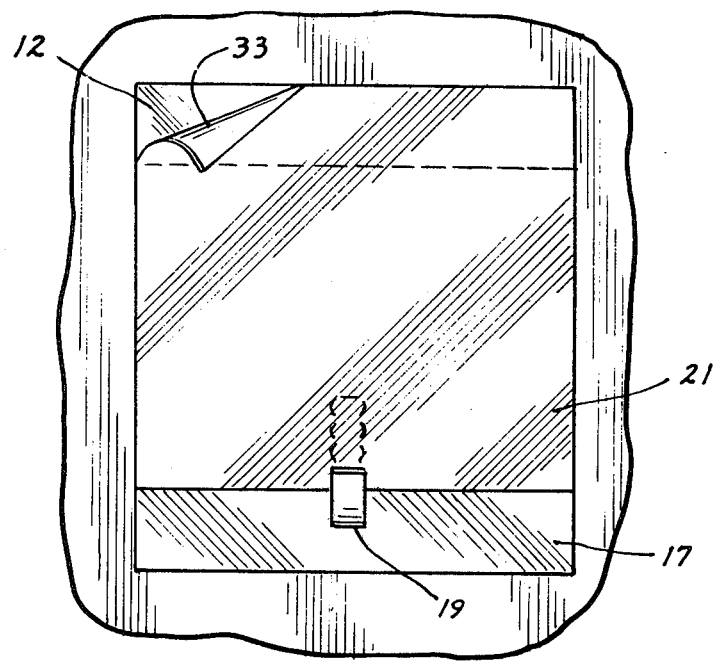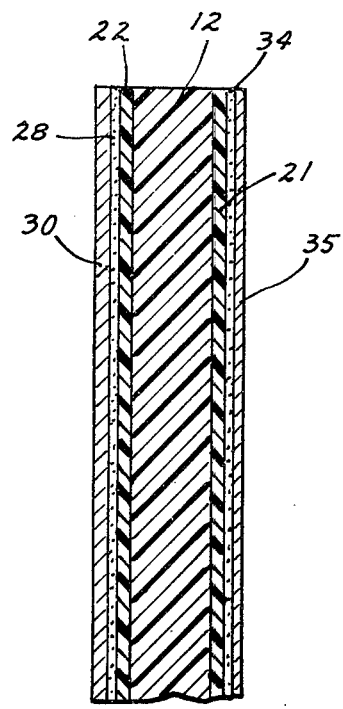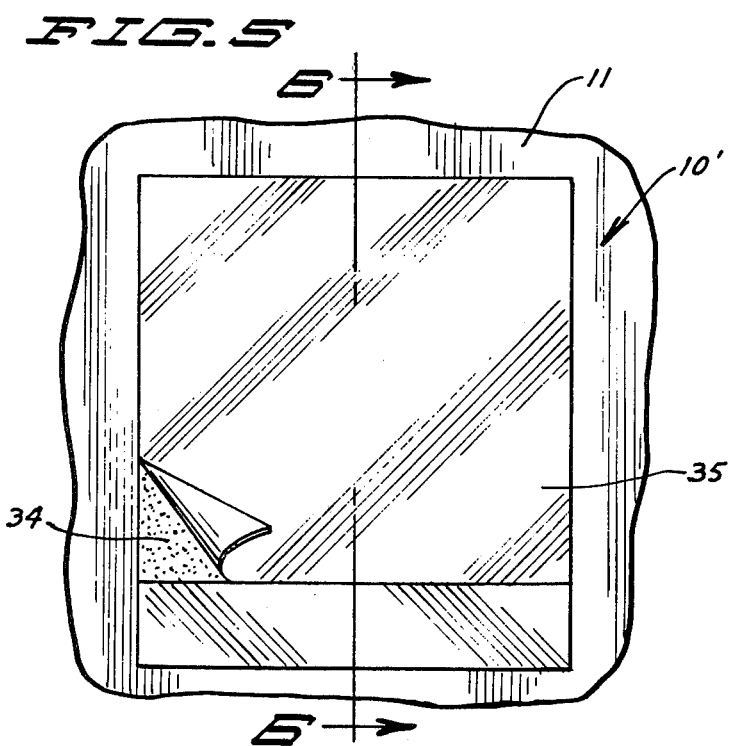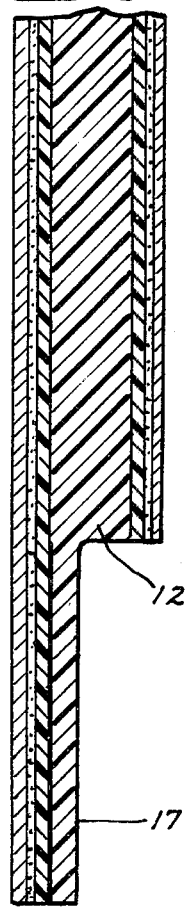

ARTICLE HOLDING DEVICE

BACKGROUND AND SUMMARY OF THE INVENTION

This device relates to an article holding device having a layered construction and which embodies the desirable characteristics of a resilient construction for complete conformance and attachment to a supporting surface and to its irregularities and of a relatively rigid or inflexible construction for an effective spreading of a load over the entire extent of the holding device. It is another characteristic of this device to have its several layers separable for the purpose of ready removal of the device from a supporting surface without damage to such surface.

It is an object of this invention therefore, to provide and article holding device comprising a plurality of layers, said layers combining to provide an article holding device of relatively great load bearing capacity and of being readily removable from a supporting surface.

It is another object of this invention to provide an article holding device having a resilient core layer carrying an article holding member and a pair of thin non-stretchable layers at each side of said core layer rendering the same relatively inflexible and one of said outer layers having an adhesive outer surface.

It is a further object of this invention to provide a layered article holding device wherein the layers thereof are separably removable from a supporting surface.

It is also an object of this invention to provide a device comprising a resilient core layer, a thin non-stretchable layer secured to each side thereof, one of said thin layers having an adhesive outer surface, the other of said thin layers having a free flap portion for ready removal of said thin layer from said core layer and said core layer having a depending flap portion for a ready removal thereof from said remaining thin layer.

As here described, the core layer in being supported by the thin non-stretchable layer at each outer side thereof retains the desirable quality of resilience for a full contact with a supporting surface and particularly with the irregularities in such a surface and said thin layers at the same time render said core layer relatively inflexible to provide for an effective distribution of the load carried by the device over the entire extent of the device. The inflexibility of the core layer results from the adherence thereto of said thin layers in being non-stretchable and hence inhibit said core layer from flexing.

It is also an object of this invention to provide a layered construction for an article holding device in which the core layer is resilient and embodies the use of a plasticizer and a pair of thin polyester layers of material at each side of said core layer, said polyester layers insulating against the migration of said plasticizer from said core layer.

These and other objects and advantages of the invention will be set forth in the following description made in connection with the accompanying drawings in which like reference characters refer to similar parts throughout the several views and in which:

FIG. 4 is a view similar to FIG. 1 in front elevation showing a modification;

FIG. 5 is a view similar to FIG. 1 in front elevation showing a modification, and FIG. 6 is a view in vertical cross-section taken on line 6—6 of FIG. 5 as indicated.

DESCRIPTION OF A PREFERRED EMBODIMENT

Figure 1:
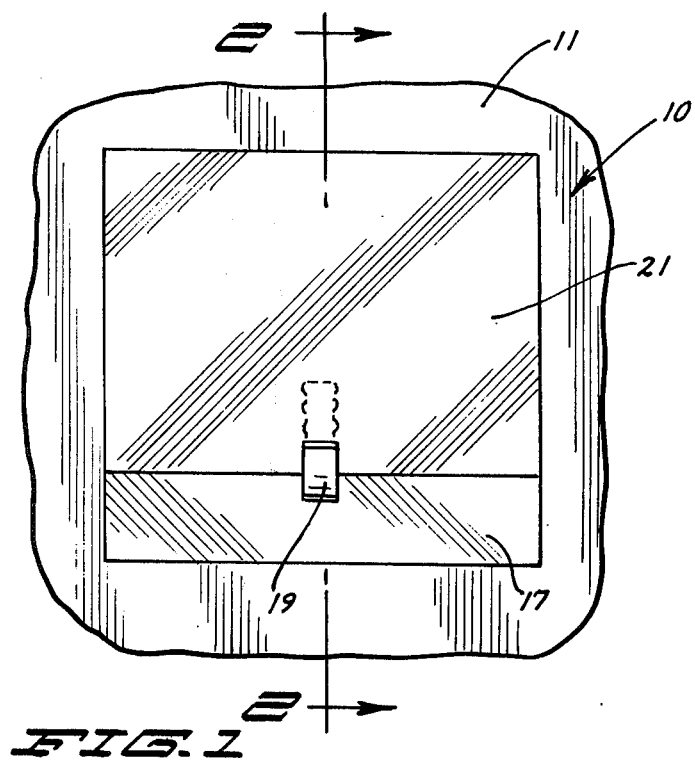
FIG. 1 is a broken view in front elevation.
Figure 3:
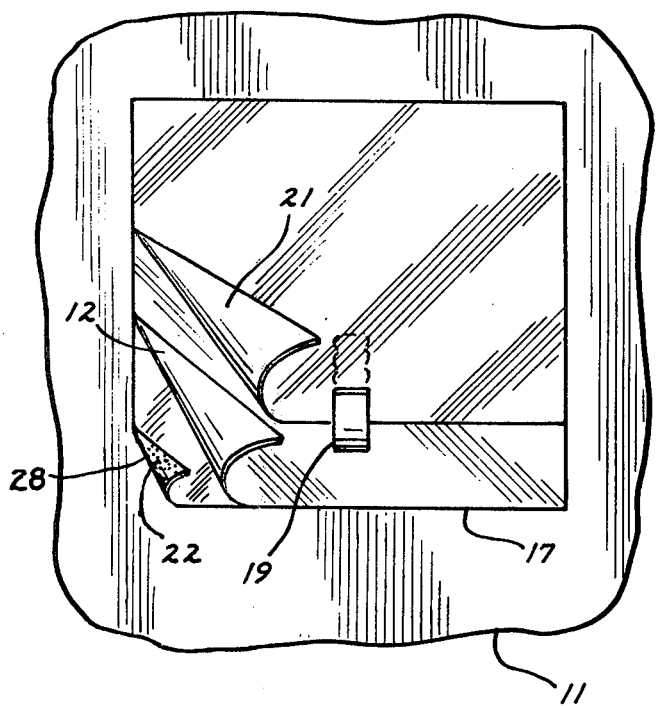
FIG. 3 is a broken view in front elevation showing portions thereof in a removable condition.
Figure 2:
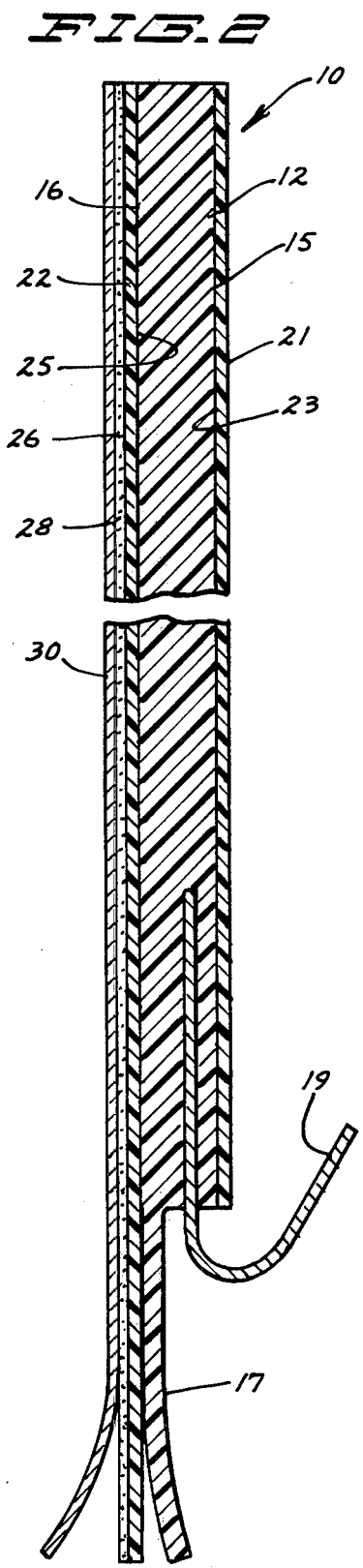
FIG. 2 is a view on an enlarged scale in vertical cross-section taken on line 2—2 of FIG. 1 as indicated.

Referring to the drawings and more particularly to FIGS. 1–3 an article holding device 10 is shown on a supporting surface 11 and said device comprises the subject matter of the invention herein.

Said device 10 generally stated is of a layered construction with the several layers thereof in combination as hereinafter described resulting in an improvement over other known like prior art devices.

In the embodiment here presented, said device consists of a central layer member 12 forming a core layer which is of substantial relative thickness such as on the order of 1/16 to 3/32 inches. This layer is a relatively soft resilient layer and one material very suitable for forming this layer is polyvinyl chloride. Said layer 12 may be formed of a plurality of thin layers of such a material fused together under heat and pressure in a known manner.

Said layer 12 has polished sides 15 and 16. Integral with said layer 12 and depending therefrom as an extension thereof of reduced thickness and adjacent the rear side 16 thereof, is a depending flap portion 17.

Carried by said layer 12 by being imbedded therein in a conventional manner and depending therefrom is an article holding member 19 here shown formed as a hook.

Overlying the sides 15 and 16 of said layer 12 are thin single layers 21 and 22 of a non-stretchable material such as of polyester. Such overlying layers may be on the order of 0.001 inches in thickness.

The sides 23 and 25 of said layers 21 and 22 engaging the respective side of said layer 12 are polished and under the application of pressure said engaging sides adhere together. The reason for this adherence is not clearly known but the fact of adherence under pressure between polyvinyl chloride and any polished hard surface material such as polyester is well known. The adherence between said layers has great shear strength. The effect of said overlying layers upon said core layer 12 will be hereinafter described. The lower portion of the layer 22 is kept from adhering to the flap 17.

The outer side of said layer 22 will be coated with a self-sticking adhesive 28 suitable for the purposes herein.

Overlying said adhesive coating 28 is a conventional protective cover strip 3 which will be removed when the device 10 is put to use.

Said core or central layer 12 in being formed of a material such as polyvinyl chloride has a good resilience and under suitable pressure applied to one side thereof conforms itself to a supporting surface such as a wall surface and accommodates very nicely irregularities which may be present in said supporting surface. A complete contact would not occur if the layer 12 is not of a sufficiently resilient material.

However with a relatively soft resilient material, the pull of a load is greatest at the point at which the load is applied such as at the point of the hook member 19. The tendency would be for the layer 12 to pull away from the supporting surface at this point and form an air pocket there beneath. Gradually this pocket would increase in size and greatly lessen the holding capacity of the device.

The improvement here which overcomes the significant pull at the point of said hook member is the application to each side of the central layer 12 of a thin layer of non-stretchable material. These thin overlying layers give the central layer the characteristic of a relatively rigid layer by inhibiting the lateral flexing of said central layer and as a result spreads the force of the load carried by the device over the entire extent of the device.

While rendering the central or core layer 12 relatively rigid as to lateral flexing, the resilient characteristic of said layer 12 has not been diminished. The overlying layer 22 though, being non-stretchable, yields very readily to pressure applied in a direction normal to its plane for complete contact of its adhesive coating to a supporting surface.

Hence there results a layered device which adheres completely to a supporting surface and effectively spreads the force of a load thereon over its entire extent.

In addition to its substantial load bearing capacity, the device 12 herein lends itself to ready removal from a supporting surface without damage to such surface even though such a surface may have a wall paper coating.

Ordinarily an article holding device is removed as a whole from a supporting surface. Here the device is peeled away in layers.

The outer layer is first removed by freeing a corner portion thereof and peeling it away as indicated in FIG. 3. The layers 21 and 22 in being secured, as described, to the layer 12 have great shear strength but have very little resistance to peel force and hence are readily peeled away.

With the removal of the layer 21, the flap 17 is taken in hand and raised upwardly to peel the layer 12 away from the underlying layer 22. The layer 12 peels away readily. With the removal of the overlying layer 21, the layer 12 in being peeled away from the underlying layer 22 is very flexible and is reversely curved in being peeled away.

Now there remains only the layer 22 overlying the supporting surface. This layer is peeled away from the supporting surface by freeing a corner portion thereof, as indicated also in FIG. 3, and pulling the same away from the underlying supporting surface. In peeling the layer 22 away from its supporting surface, just a linear portion at a time is pulled away and thus the entire layer is very readily removed without damage to said supporting surface.

In addition to what has been above described, with the core layer 12 being formed of a polyvinyl chloride, the layers 21 and 22 prevent the migration of the plasticizer embodied in said core layer. Said plasticizer if permitted to migrate would loosen the adhesive coating 28 and would lessen or effectively negate the holding capacity of the device.

The above description in addition to describing the structure of the device 10 also describes a method by which the device may be formed.

MODIFICATION

In FIG. 4, a modificaton is shown in which the layer 21 is provided with a free upper flap portion 33 to make it more convenient to peel said layer away from the layer 12 at such time as the device is removed from a supporting surface.

MODIFICATION

A modification is shown in FIGS. 5 and 6 in which like portions of the device above described are indicated by like reference numerals and the device as modified is indicated by the reference numeral 10'.

In lieu of having hook 19 for a holding member, said device 10' has an adhesive coating 34 applied to the outer surface of the layer 21. Overlying said adhesive coating 34 is an outer protective cover strip 35.

The device herein described has proved very successful in actual use and has developed significant commercial interest.

It will of course be understood that various changes may be made in the form, details, arrangement and proportions of the product and in the steps and sequence of steps of the method without departing from the scope of applicant's invention which, generally stated, consists in a product and method capable of carrying out the objects above set forth, such as disclosed and defined in the appended claims.

What is claimed is:

1. A separable article holding device, having in combination
   a body portion comprising a resilient central layer conforming to a wall surface under pressure,
   a flap portion integral with said layer and depending therefrom,
   a thin non-stretchable layer of material overlying each side of central layer and adhering thereto,
   one of said overlying layers having an adhesive coated outer surface,
   a protective layer overlying said adhesive coated surface, and
   an article holding means carried by said body portion.

2. The structure set forth in claim 1, wherein
   said central layer is on the order of 1/16 to 3/32 inches in thickness.

3. The structure set forth in claim 1, wherein
   said central layer is on the order of 1/16 to 3/32 inches in thickness, and
   said overlying layers are on the order of 0.001 inches in thickness.

4. The structure set forth in claim 1, wherein
   said central layer is preferably formed of polyvinyl chloride, and
   said overlying layers are formed of a polyester.

5. The structure set forth in claim 1, wherein
   said overlying layers are readily separable from said central layer.

6. An article-holding device comprising
   a resilient central layer conforming to a wall surface under pressure,
   a thin non-stretchable layer of material overlying each side of said central layer and adhering thereto,
   an adhesive coating carried by an outer surface of one of said overlying layers,
   a protective strip overlying said adhesive coating, and
   an article-holding means comprising a hook carried by said central layer.

7. An article-holding device, having in combination
   a central layer of material of sufficient resilience to conform to a wall surface under pressure, a flap portion integral with said layer and depending therefrom, a thin non-stretchable layer of material overlying each side of said central layer and adhering thereto, and an adhesive coating carried on the outer surface of each of said overlying layers, whereby one of said overlying layers is securable to a supporting surface and the other of said overlying layers forms an article-holding means.

* * * * *